(12) United States Patent
Uehara (10) Patent No.: US 8,731,327 B2
(45) Date of Patent: May 20, 2014

(54) IMAGE PROCESSING SYSTEM AND IMAGE PROCESSING METHOD

(75) Inventor: Hiroyasu Uehara, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 203 days.

(21) Appl. No.: 13/217,722

(22) Filed: Aug. 25, 2011

(65) Prior Publication Data

US 2012/0057747 A1    Mar. 8, 2012

(30) Foreign Application Priority Data

Sep. 3, 2010 (JP) ................................. 2010-198225

(51) Int. Cl.
*G06K 9/36* (2006.01)
*G06K 9/20* (2006.01)
*G06K 9/32* (2006.01)

(52) U.S. Cl.
USPC ............ 382/284; 382/276; 382/282; 382/294

(58) Field of Classification Search
USPC .................................................. 382/294, 103
See application file for complete search history.

(56) References Cited

U.S. PATENT DOCUMENTS

| | | | | |
|---|---|---|---|---|
| 5,030,945 A * | 7/1991 | Yeomans | ....................... | 345/676 |
| 5,686,960 A * | 11/1997 | Sussman et al. | ........... | 348/218.1 |
| 5,852,446 A * | 12/1998 | Hashimoto et al. | ........... | 345/441 |
| 6,469,710 B1 * | 10/2002 | Shum et al. | .................... | 345/619 |
| 6,516,099 B1 * | 2/2003 | Davison et al. | ............... | 382/284 |
| 6,546,120 B1 * | 4/2003 | Etoh et al. | ...................... | 382/107 |
| 7,215,830 B2 * | 5/2007 | Knee et al. | ..................... | 382/293 |
| 7,388,599 B2 * | 6/2008 | Maddison et al. | .............. | 348/79 |
| 7,773,828 B2 * | 8/2010 | Sakata et al. | ................... | 382/294 |
| 2001/0045979 A1 * | 11/2001 | Matsumoto et al. | ............ | 348/43 |
| 2002/0181802 A1 * | 12/2002 | Peterson | ....................... | 382/284 |
| 2003/0063816 A1 * | 4/2003 | Chen et al. | .................... | 382/284 |
| 2003/0148802 A1 * | 8/2003 | Takahama et al. | ................ | 463/1 |
| 2006/0133693 A1 * | 6/2006 | Hunt | .............................. | 382/293 |
| 2007/0297694 A1 | 12/2007 | Kurata | | |
| 2008/0175439 A1 | 7/2008 | Kurata | | |
| 2008/0288528 A1 * | 11/2008 | Gallager | ....................... | 707/102 |
| 2010/0295961 A1 | 11/2010 | Terauchi | | |
| 2010/0295962 A1 | 11/2010 | Terauchi | | |
| 2011/0110585 A1 * | 5/2011 | Kang et al. | .................... | 382/164 |

FOREIGN PATENT DOCUMENTS

| | | |
|---|---|---|
| JP | 11-086003 A | 3/1999 |
| JP | 11-242747 A | 9/1999 |
| JP | 2007-336121 A | 12/2007 |
| JP | 2008-005084 A | 1/2008 |

* cited by examiner

*Primary Examiner* — Michelle Entezari
(74) *Attorney, Agent, or Firm* — Greenblum & Bernstein, P.L.C.

(57) ABSTRACT

An image processing system performs a position-matching operation on first and second images, which are obtained by photographing the same object a plurality of times. A plurality of shift points are detected in the second image. The shift points correspond to fixed points, which are dispersed throughout the whole of the first image. The second image is divided into a plurality of partial images, the vertices of which are positioned at the same coordinates as the fixed points in the first image. Each of the partial images are shifted to the shift points to transform the partial images so that corresponding transformed partial images are produced. The transformed partial images are combined to form a combined image.

12 Claims, 11 Drawing Sheets

IMAGE PROCESSING SYSTEM AND IMAGE PROCESSING METHOD

BACKGROUND OF THE INVENTION

1. Field of the Invention

The present invention relates to an image processing system in which, when a plurality of images are composed, one of the images is transformed in order to facilitate a position-matching operation of the images.

2. Description of the Related Art

Conventionally, an image composition technique is known, such as HDR (i.e., high dynamic range imaging), by which a dark area and a bright area contained in the same image are clearly indicated. An image-blur correcting composition method is also known as an image composition technique, by which an influence of camera-shake is reduced. In HDR, an average image is created from an image captured at a higher shutter speed and an image captured at a lower shutter speed, so that an image having a virtually wide dynamic range is obtained. In the image-blur correcting composition method, a plurality of images are captured at a high shutter speed, such that the camera shake will hardly affect the images, and then summed together so that a single image, in which an influence of camera-shake is reduced and which has sufficient brightness, is obtained. Thus, various image composition techniques using a plurality of images have been proposed.

In image compositions using a plurality of images, it is required that pixels positioned at the same coordinates in the images correspond to the same point of the object. However, in a plurality of images, which are photographed without a tripod at a different time, a small deviation may occur in the images because of a translation or rotation of the camera.

Thus, some methods for position-matching two images have been proposed as disclosed in US2008/0175439 (A1). In '439, motion vectors of a plurality of target blocks, set in one image, are calculated for the target blocks, and the magnitude of translation and the rotational angle about the optical axis of the whole image are calculated based on the motion vectors.

According to the method disclosed in '439, an image composition using a position-matching operation can be performed between two images for a translation and a rotation about the optical axis. However, when a camera is rotated about an axis perpendicular to the optical axis (e.g., panning or tilting), it is difficult to compose images using a position-matching operation because the object images contained in the two images are deformed.

SUMMARY OF THE INVENTION

Therefore, an object of the present invention is to provide an image processing system and method by which one of two images is transformed, so that the position-matching operation on the two images is easy to perform and the images can be composed when one of the images is captured by a camera that has been rotated about a straight line, regardless of the direction of the straight line.

According to the present invention, there is provided an image processing system performing a position-matching operation on first and second images, which are obtained by photographing the same object a plurality of times, so that the first and second images are composed. The image processing system comprises a shift point detecting processor, an image dividing processor, an image transforming processor, and an image combining processor.

The shift point detecting processor detects a plurality of shift points in the second image, the plurality of shift points corresponding to a plurality of fixed points that are dispersed throughout the whole of the first image. The image dividing processor divides the second image into a plurality of polygonal partial images, the vertices of which are positioned at the same coordinates as the fixed points in the first image. The image transforming processor shifts the vertices of each of the partial images to the shift points to transform the partial images so that corresponding transformed partial images are produced. The image combining processor forms a combined image by combining all of the transformed partial images in such a manner that the common shift points remain in their same positions.

According to the present invention, there is provided an image processing method performing a position-matching operation on first and second images, which are obtained by photographing the same object a plurality of times, so that the first and second images are composed. The image processing method comprises a detecting step, a dividing step, a shifting step, and a forming step.

The detecting step detects a plurality of shift points in the second image, the plurality of shift points corresponding to a plurality of fixed points that are dispersed throughout the whole of the first image. The dividing step divides the second image into a plurality of polygonal partial images, the vertices of which are positioned at the same coordinates as the fixed points in the first image. The shifting step shifts the vertices of each of the partial images to the shift points to transform the partial images so that corresponding transformed partial images are produced. The forming step forms a combined image by combining all of the transformed partial images in such a manner that the common shift points remain in their same positions.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings.

Figure 1:
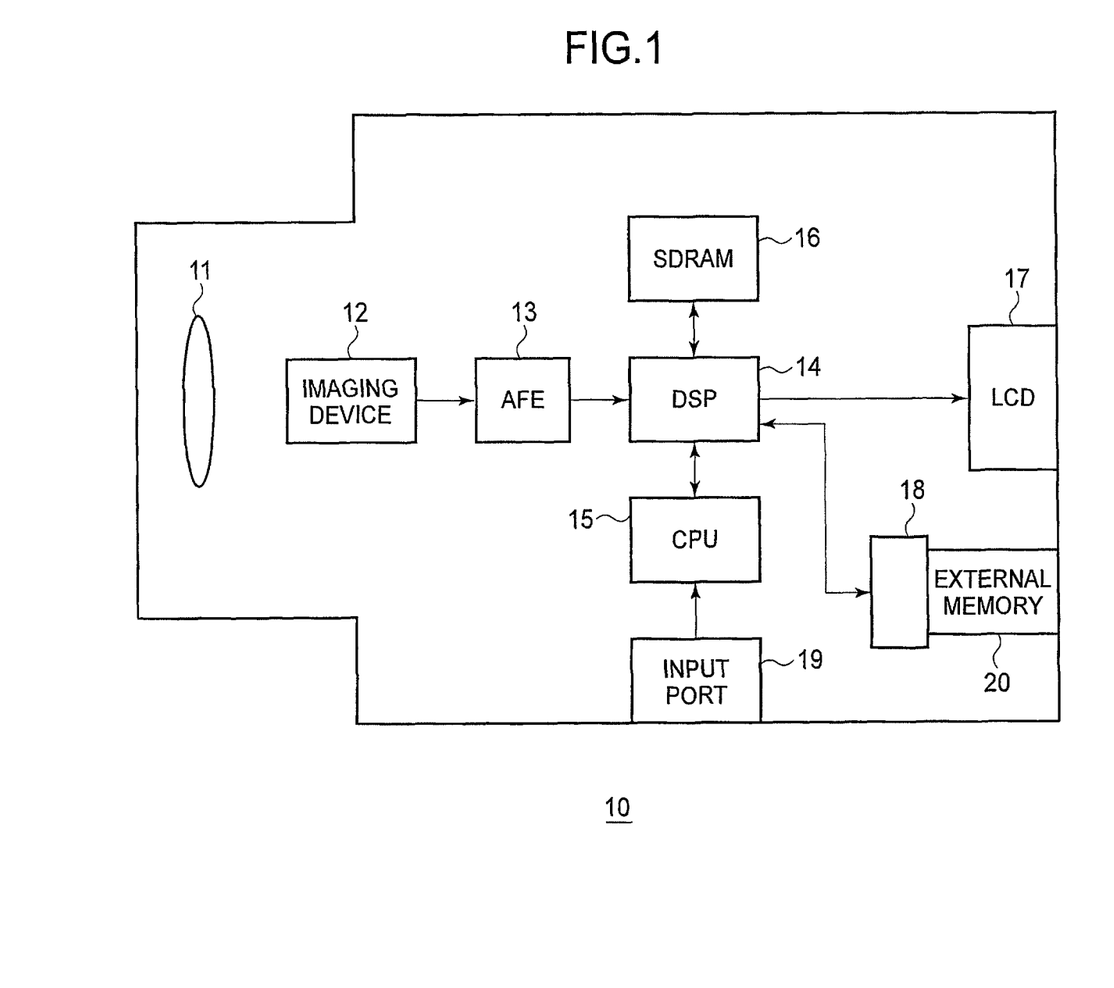
FIG. 1 is a block diagram roughly showing an electrical structure of a digital camera provided with an image processing system to which an embodiment of the present invention is applied.

FIG. 1 shows a block diagram roughly showing an electrical structure of a digital camera provided with an image processing system to which an embodiment of the present invention is applied.

The digital camera 10 has a photographing optical system 11, an imaging device 12, an AFE (Analog Front End) 13, a DSP (Digital Signal Processor) 14, a CPU 15, an SDRAM 16, an LCD 17, a connector 18, and an input port 19.

The photographing optical system 11 is optically connected to the imaging device 12, which is provided with a plurality of lenses including a focus lens (not shown). The focus lens is displaced along the optical axis, so that an optical image of the object can be brought into focus on a light-receiving surface of the imaging device 12.

The imaging device 12 is a CCD, for example. When the imaging device 12 receives an optical image, an image signal corresponding to the optical image is generated in the imaging device 12.

The imaging device 12 is driven by an imaging device drive circuit (not shown), and periodically generates a still image, i.e., one frame of an image signal, and a moving image, i.e., a plurality of frames of image signals. The electronic shutter speed of the imaging device is controlled by the imaging device drive circuit.

The imaging device is connected to the DSP 14 through the AFE 13. An image signal generated by the imaging device 12 is converted to digital image data by the AFE 13. The image data are transmitted to the DSP 14.

The image data are temporally stored in the SDRAM 16, which is a work memory. The image data are composed of RGB components, which are converted to luminance data components and color-difference components through a matrix process in the DSP 14.

In the DSP 14, the image data composed of the luminance data components and the color-difference components are subject to an image process including a gamma correction and an edge enhancement. Further, in the DSP 14, it is possible to generate singular image data from a plurality of image data that are composed in an HDR photographing mode or an image-blur reduction mode.

An image corresponding to the processed image data is displayed by the LCD 17. The image data can be stored in an external memory 20 connected to the camera 10 through the connector 18.

The DSP 14 is connected to the CPU 15, by which each component, including the DSP 14, of the camera 10 is controlled. The input port 19 is connected to the CPU 15, and thus, based on various different commands input through the input port 19, the CPU 15 controls each component of the camera 10.

The digital camera 10 can be operated according to a plurality of different photographing modes, such as a normal photographing mode, the HDR photographing mode, and the image-blur reduction mode.

In the normal photographing mode, when the user fully presses a release button (not shown), one frame of an image signal is generated by the imaging device 12, with an exposure condition (i.e., shutter speed, ISO sensitivity, and opening degree of aperture) automatically or manually set. The image signal is subjected to the image processing described above, and then stored in the external memory 20.

In the HDR photographing mode, when the user fully presses the release button, the same object is continuously (or a plurality of times) photographed under identical exposure conditions, and two frames of image signals are continuously generated by the imaging device 12. One of the image signals is generated at a low shutter speed, and the other image signal is generated at a high shutter speed. The two frames of image signals are subject to a position-matching operation described below, and then an HDR composition process, in which the image signals are averaged, so that an HDR image signal is generated and stored in the external memory 20.

In the image-blur reduction mode, when the user fully depresses the release button, the same object is continuously photographed under the identical exposure conditions, and a plurality of frames of image signals is continuously generated by the imaging device 12. All of the image signals are generated based on the object images captured at a shutter speed at which a camera shake will hardly affect the object images. A plurality of frames of image signals is subject to the position-matching operation, and then to the image-blur reduction process, in which the image signals are summed together, so that a blur-reduced image is generated and stored in the external memory 20.

The position-matching operation carried out in the DSP is described below. As described above, in the HDR photographing mode and the image-blur reduction mode, for composing a plurality of frames of image signals, each of the image signals is position-matched. Namely, the image signals are processed such that optical images received by pixels at the same corresponding coordinates in the imaging device become the same corresponding portions of the object.

In the position-matching operation, an image designating process, a shift point detecting process, an image dividing process, an image transforming process and an image combining process are carried out in this order, and then a trimming process and an image composition process are performed.

In the image designating process, an image that is first generated from a plurality of images, which are data stored in the SDRAM 16, is designated as an original image (i.e., a first image). An image that is generated immediately after the original image is designated as a comparison image (i.e., a second image). Regarding the original and comparison images, the image processes described below are performed, so that the position-matching operation is carried out.

Note that, when the images stored in the SDRAM 16 include three or more frames, after the position-matching operation is completed for the original and (first) comparison image, the next (in terms of chronological order) image stored in the SDRAM is designated as the comparison image and the position-matching operation is repeated using the original image and the newly designated (second) comparison image. This process continues until all of the images (third, fourth, fifth, etc.,) stored in the SDRAM have undergone the position-matching operation with the original image.

In the shift point detecting process, which is performed after the image designating process, shift positions of fixed points are detected. The fixed points are a plurality of points, positions of which are predetermined in the original image. The shift positions of the fixed points are positions of shift points in the comparison image corresponding to the fixed points in the original image. Namely, the fixed point in the original image and the shift point in the comparison image correspond to the identical portion of the object image.

Figure 2:
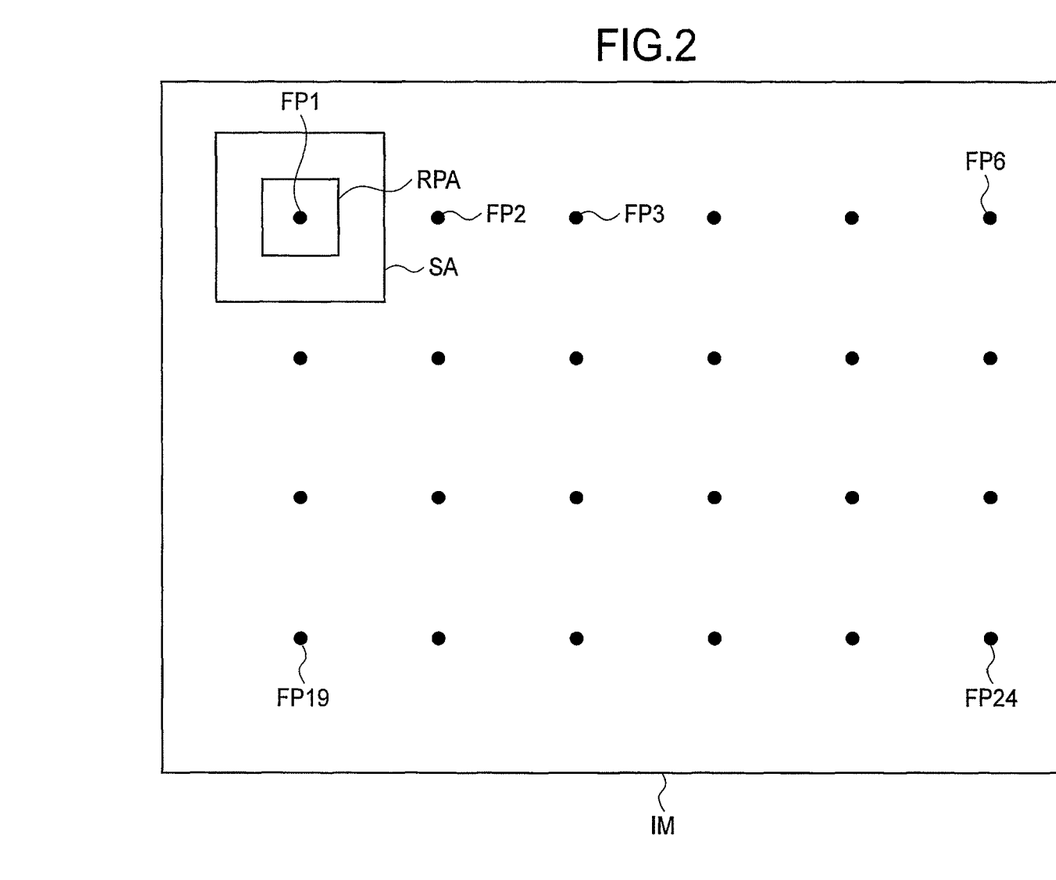
FIG. 2 is a view showing a disposition of fixed points in a photographed image.

As shown in FIG. 2, many fixed points are uniformly dispersed throughout the whole of the original image IM. In the example shown in the drawing, for the simplicity of explanation, 24 fixed points FP1-FP24 are shown even though many more fixed points are actually set. The fixed points FP1, FP6, FP19, and FP 24 are positioned close to the corners of the original image IM.

In the embodiment, the fixed points FP1-FP24 are dispersed such that the fixed points FP1, FP6, FP19, and FP 24 are positioned at the vertices of the rectangle, the fixed points on the long side of the rectangle are positioned to equally divide the long side, and the fixed points on the short side of the rectangle are positioned to equally divide the short side. Regarding all of the fixed points, any two neighboring fixed points in either the horizontal or vertical direction are separated by an equal distance, and four fixed points adjacent to each other are positioned at the vertices of a square. The coordinates of each of the fixed points are stored in an EEPROM (not shown), and are read out to the DSP 14 when the shift point detecting process is started.

After the coordinates of the fixed points are read out, the shift positions of the fixed points FP1-FP24 are detected as follows.

For detecting the shift position of the fixed point FP1, an original small image RPA is defined in the original image IM. The original small image RPA is a square, and the center of the square coincides with the fixed point FP1. In the comparison image, a search area SA is defined, which is a square, the center of which is the same coordinate as that of the fixed point FP1. The search area SA is larger than the original small image RPA.

Figure 3:
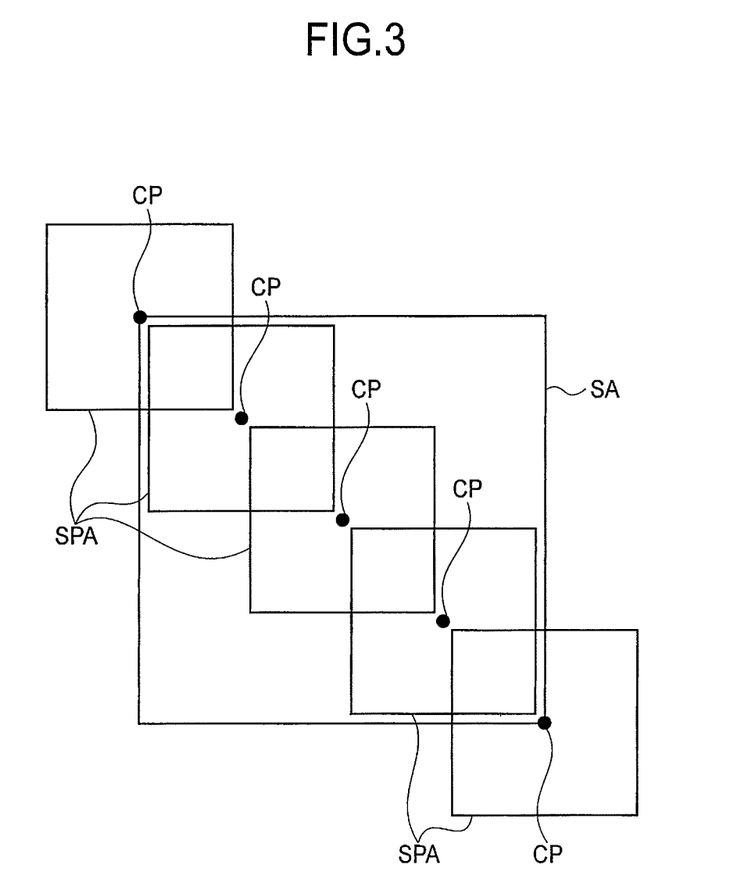
FIG. 3 is a view showing a relationship among a search area, candidate points, and comparison small images.

In the comparison image, as shown in FIG. 3, all the pixels contained in the search area SA are set as candidate points CP, which are in connection with or correspond to the fixed point FP1, and a plurality of comparison small images SPA is defined or selected. A comparison small image SPA is a square, which has the same size as the original small image RPA, and the center of each coincides with each of the candidate points CP. Note that, although only some of the pixels on a diagonal line of the square are shown in FIG. 3, all of the pixels at all of the other positions are also defined or selected as candidate points CP, and the other comparison small images SPA are also defined.

Regarding the fixed point FP1 (see FIG. 2), the corresponding original small image RPA and a plurality of comparison small images SPA (see FIG. 3) are set, and a luminance value for each pixel of the comparison small image SPA and a luminance value for each pixel of the original small image RPA are then read out from the SDRAM 16.

The sum of the absolute value of the difference (SAD) between the luminance values of the original small image RPA and the comparison small image SPA is calculated for all of the candidate points CP. The SAD is obtained by calculating the absolute value of the differences between the luminance values of the corresponding pixels of the original small image RPA and the comparison small image SPA, for all pixels in each of the images RPA and SPA, and then summing up the absolute values.

The SADs are obtained for all the pixels in the search area SA, i.e., all the candidate points CP, and then the minimum value of the SADs is detected. When the SAD for all the pixels is a minimum, it is determined that the comparison small image SPA is mostly similar to the original small image RPA. Namely, the candidate point CP, at which the SAD is a minimum, is chosen as the shift point that is the shift position of the fixed point FP1.

Figure 4:
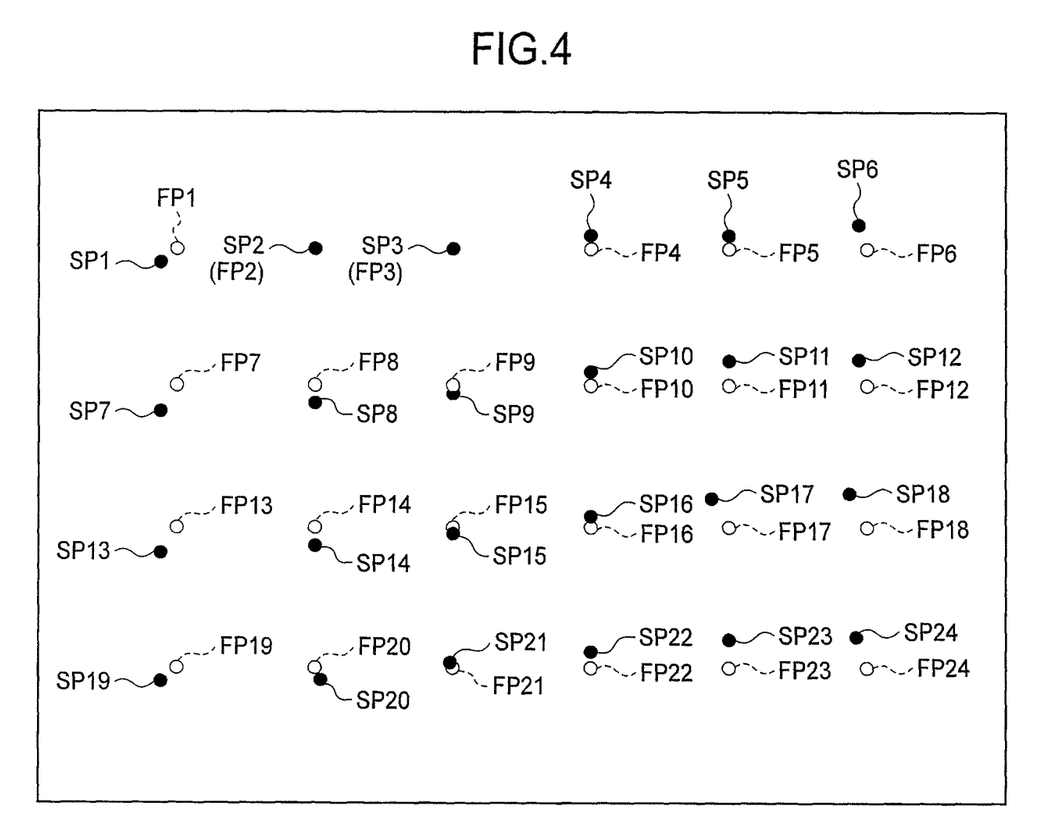
FIG. 4 is a view showing an example of positions of shift points corresponding to the fixed points.

After detecting the shift position of the fixed point FP1, a shift position of the fixed point FP2 (see FIG. 2) is detected in a similar manner as the detection of the fixed point FP1. Similarly, shift points of the other fixed points FP3-FP24 are detected. Thus, the shift positions of the fixed points FP1-FP24 are detected as the shift points SP1-SP24, as shown in FIG. 4.

Figure 5:
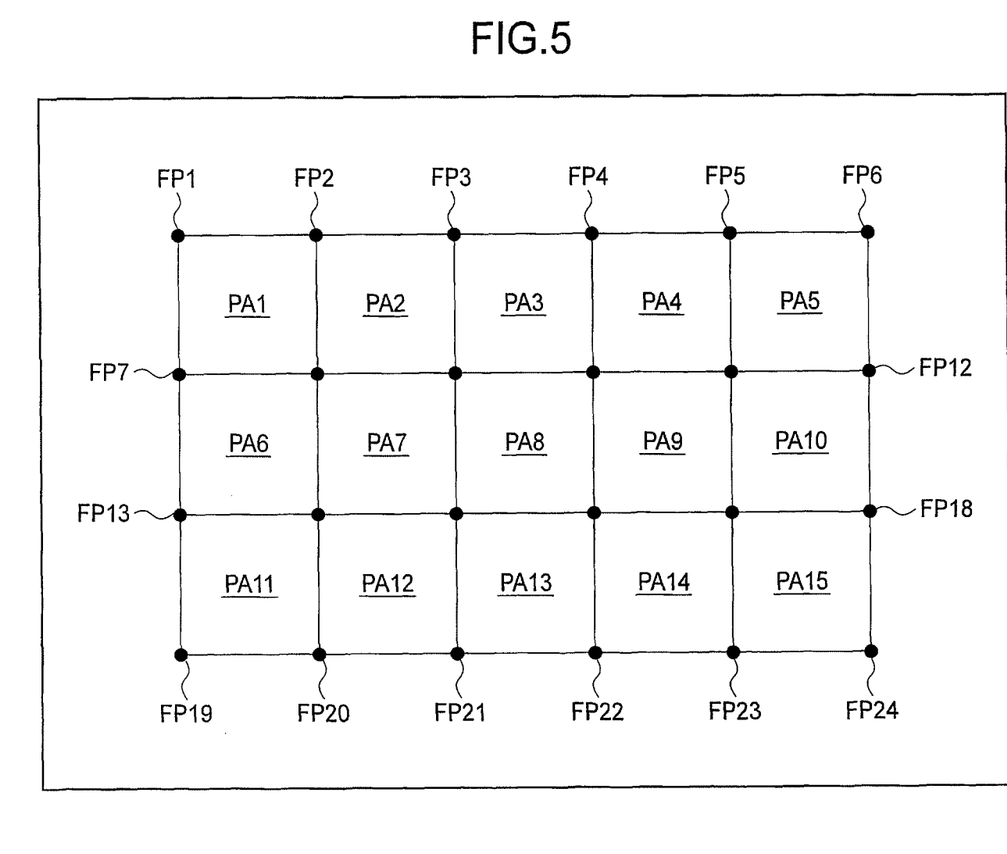
FIG. 5 is a view showing a disposition of partial images.

After detecting the shift points SP1-SP24, the image dividing process is performed, in which the comparison image is divided into 15 square partial images PA1-PA15, the vertices of which have the same coordinates as the fixed points, as shown in FIG. 5. Note that, in FIG. 5, each of the vertices is indicated by the same reference (FP1-FP24) as that of its corresponding fixed point.

After the division into the partial images PA1-PA15, the image transforming process is performed, in which the partial images PA1-PA15 of the comparison image are transformed as described below.

Figure 6:
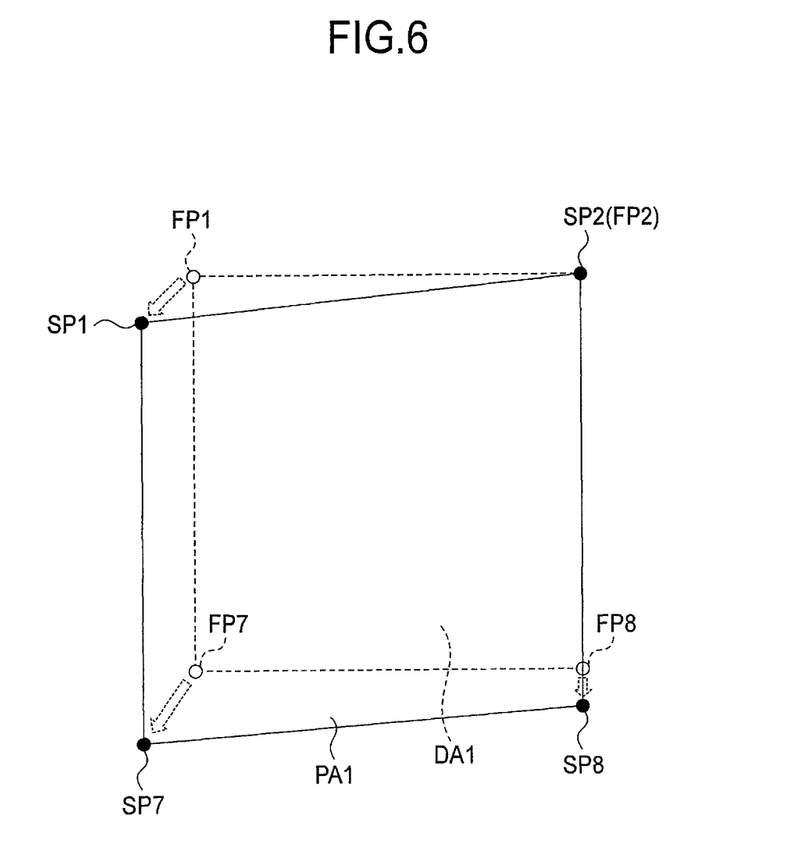
FIG. 6 is a view showing a transformation from a partial image to a transformed partial image.

As shown in FIG. 6, the vertices FP1, FP2, FP7, and FP8 of the partial image PA1 are shifted to the shift points SP1, SP2, SP7, and SP8, respectively, to transform the partial image PA1. Thus, the transformed partial image DA1 corresponding to the partial image PA1 is produced. Similarly, the other partial images are transformed to the transformed partial images.

Note that the transformation of the image can be carried out using a well-known coordinate transforming method, such as the affine-transformation.

Figure 7:
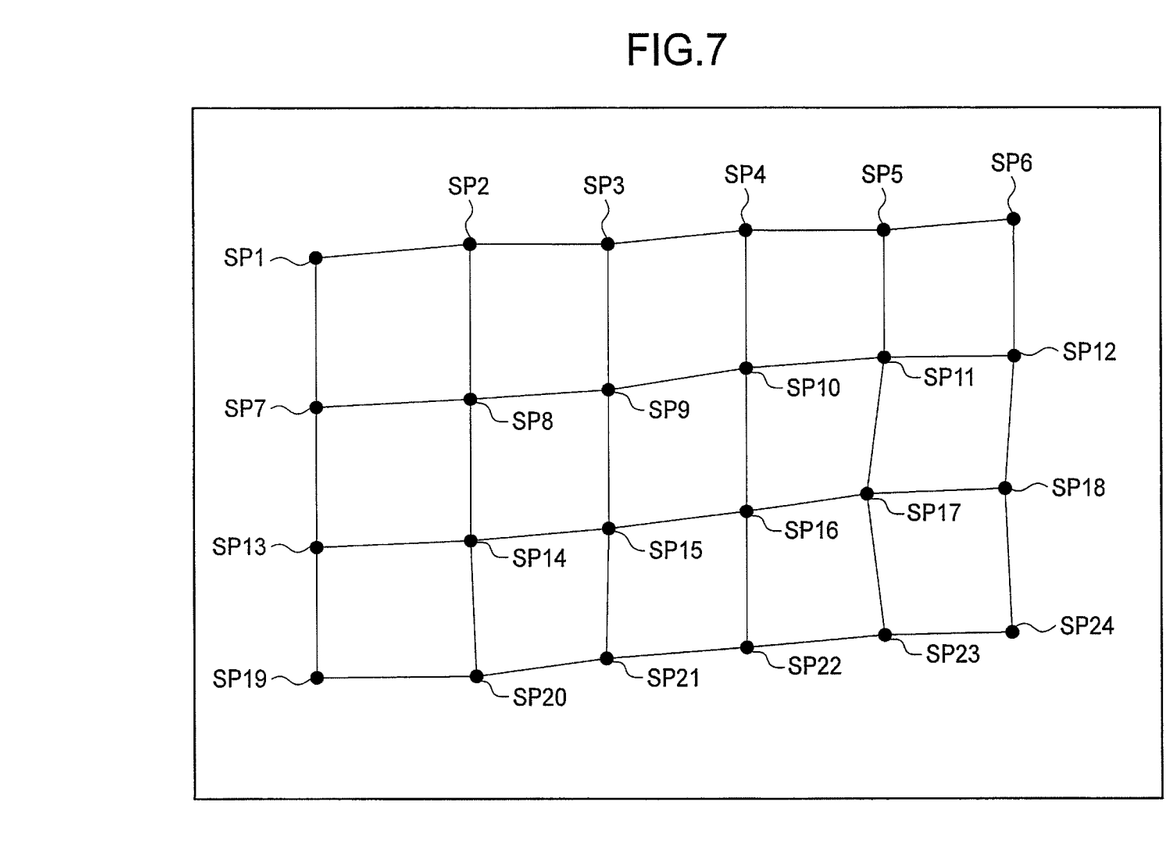
FIG. 7 is a view showing a combined image obtained by combining all of the transformed partial images.

After all the transformed partial images are obtained, the image combining process is performed, in which all of the transformed partial images are combined in such a manner that the common shift points remain in their same positions. FIG. 7 shows a combined image obtained by combining all of the transformed partial images.

The data of the combined image is stored in the SDRAM 16. When three or more images are stored in the SDRAM 16, the extra images are also designated as comparison images, and based on the original image and the newly designated comparison images, combined images are formed and the data of the combined images are stored in the SDRAM 16.

Figure 8:
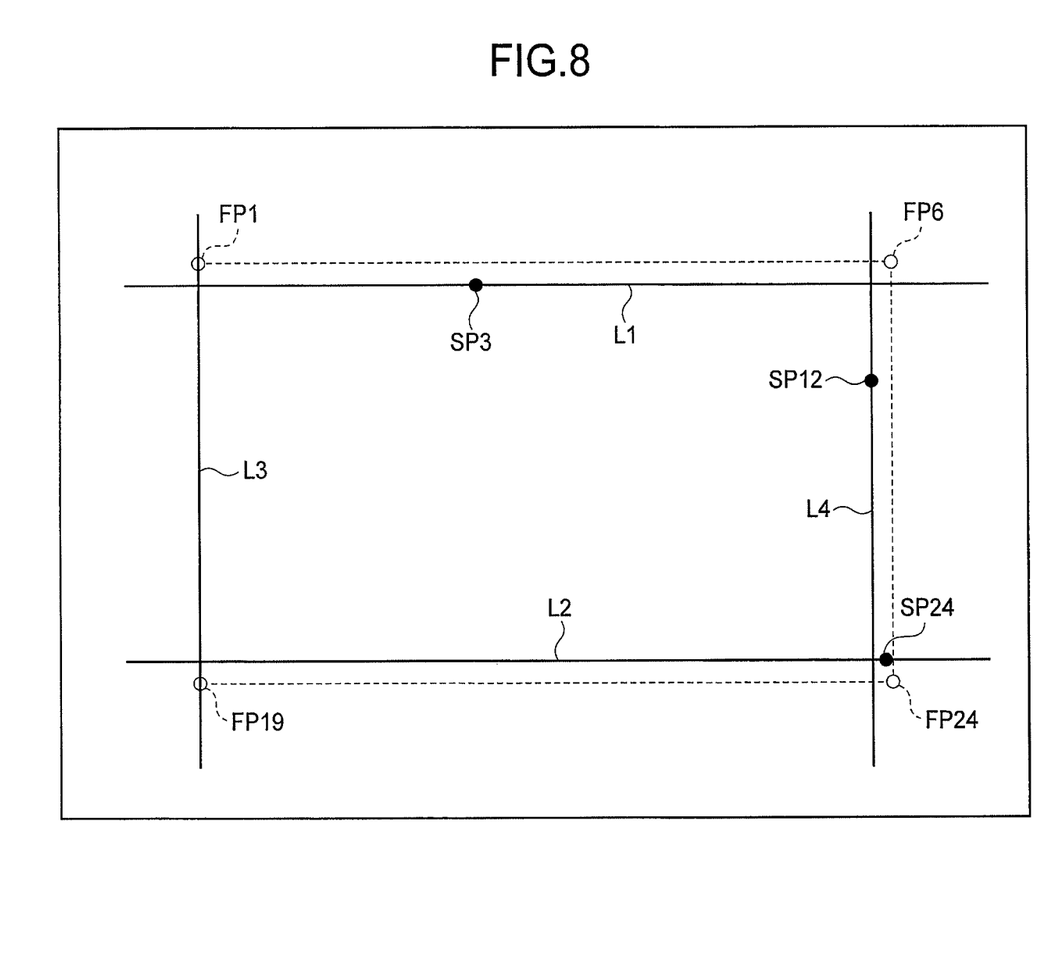
FIG. 8 is a view showing a trimming process.

When all of the images stored in the SDRAM 16, except for the original image, have been subjected to the image combining process to produce the combined images, the trimming process is performed on the original image and the combined images. In the trimming process, as shown in FIG. 8, areas other than an overlapping area between the original image and the combined image are removed. The original image and the combined image are then composed. The positions of the upper end, the lower end, the left end, and the right end are determined first, and the outer areas beyond the upper end, the lower end, the left end, and the right end are then removed from both the original image and the combined image.

For determining the position of the upper end, the lowest position among the fixed points FP1-FP6 in the original image and the shift points SP1-SP6 in the combined image, is detected. In the example shown in FIG. 8, the position of the detected shift point SP3 is determined as the upper end to be used for the trimming process.

In a similar way as above, the shift point SP24 is detected at the highest position among the fixed points FP19-FP24 in the original image and the shift points SP19-SP24 in the combined image, and therefore it is used as the lower end in the trimming process.

Similarly, the rightmost position among the fixed points FP1, FP7, FP13, and FP19 in the original image and the shift points SP1, SP7, SP13, and SP19 in the combined image, is detected. The position of each of the fixed points FP1, FP7, FP13, and FP19 is determined as the left end used for the trimming process.

Similarly, the shift point SP12, which is detected at the leftmost position among the fixed points FP6, FP12, FP18, and FP24 and the shift points SP6, SP12, SP18, and SP24 in the combined image, and therefore it is used as the right end in the trimming process.

Thus, a straight line L1, which passes through the shift point SP3 and is parallel to a straight line connecting the fixed points FP1 and FP6, is determined as the upper end. Similarly, a straight line L2, which passes through the shift point SP24 and is parallel to a straight line connecting the fixed points FP19 and FP24, is determined as the lower end. Similarly, a straight line L3, which passes through the fixed points FP1 and FP19, is determined as the left end. Similarly, a straight line L4, which passes through the shift point SP12 and is parallel to a straight line connecting the fixed points FP6 and FP24, is determined as the right end.

As described above, by determining the upper, lower, left, and right ends for the trimming process, a rectangular area, in which the original image and the combined image both overlap each other, can be obtained.

Namely, an area outside the rectangular area enclosed by the upper, lower, left, and right ends is removed from the original image and all the combined images, and thus the trimming process is completed. The data of the trimmed original image and the combined images are stored in the SDRAM 16, and thus the position-matching operation ends. Due to the trimming process, the shape and the size of the original image and the combined images can coincide with each other.

An image composition process such as the HDR composite process or the image-blur correcting composition is carried out on the original image and the combined images, which are trimmed and stored in the SDRAM 16, and thus an HDR image signal or an image-blur reduced signal is generated and stored in the external memory 20.

Figure 9:
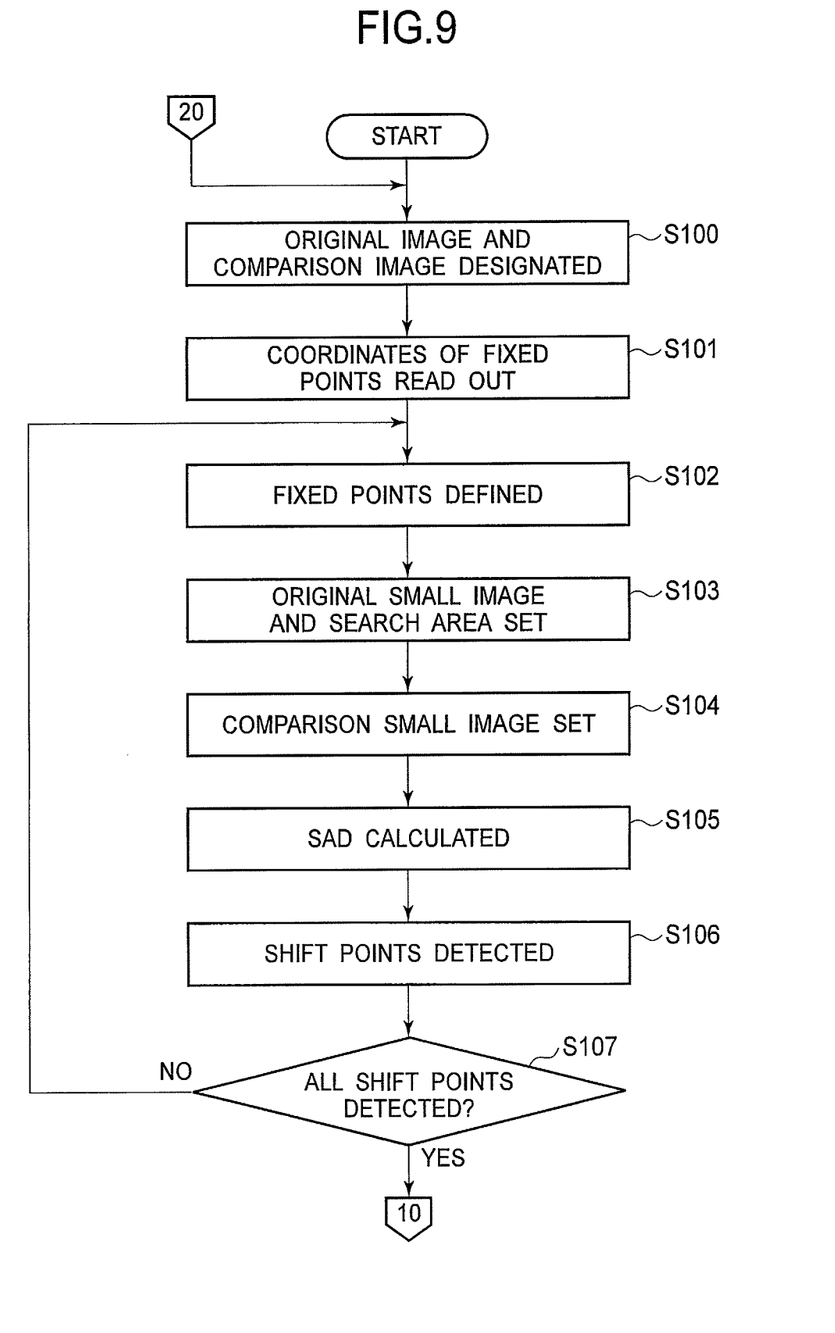
FIG. 9 is the first half of a flowchart of a position-matching operation.
Figure 10:
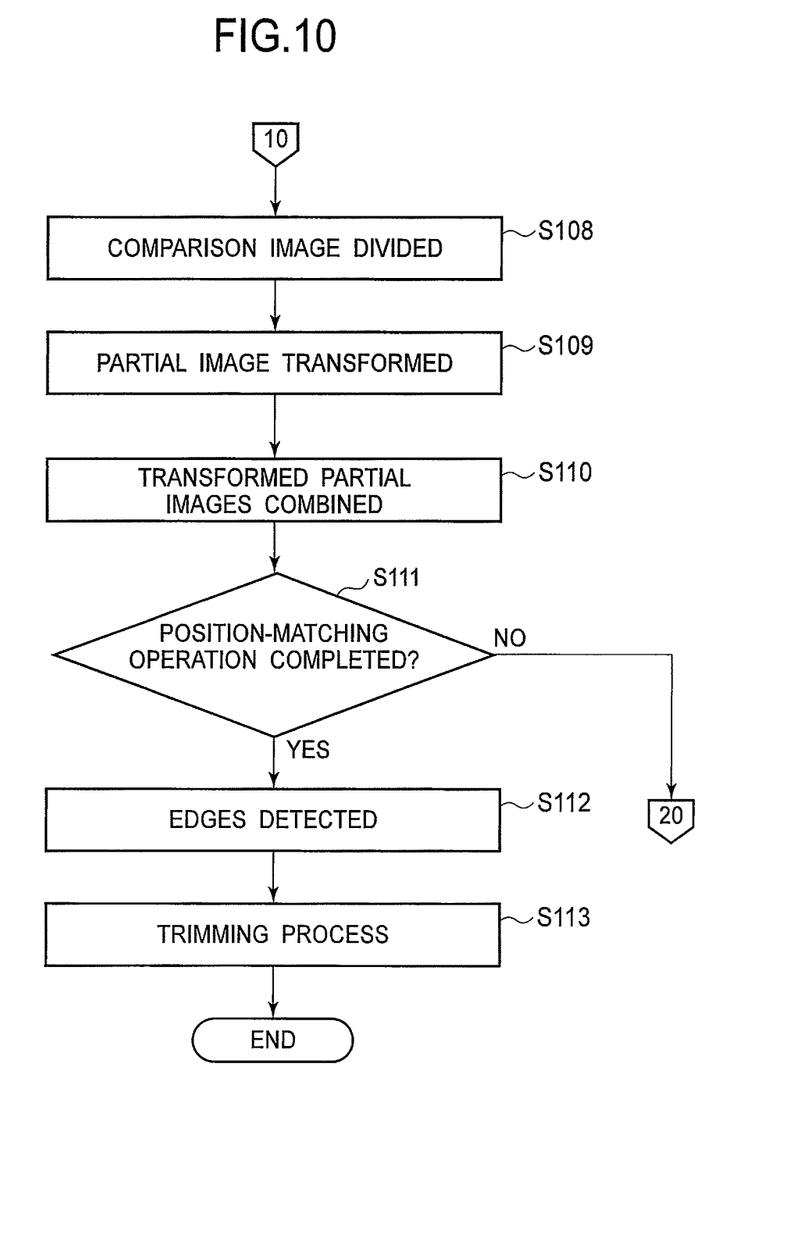
FIG. 10 is the last half of the flowchart of the position-matching operation.

The position-matching operation performed by the DSP 14 is described below with reference to flowchart shown in FIGS. 9 and 10. The position-matching operation is carried out in the HDR photographing mode or the image-blur reduction mode, after a photographing operation is performed and luminance values for a plurality of image data are stored in the SDRAM 16.

In step S100, an image, which is generated first among a plurality of images stored in the SDRAM 16, is designated as an original image. Further, an image other than the image designated as the original image, for which a combined image has not been formed, is designated as a comparison image. After the designation of the original image and the comparison image, step S101 is carried out, and coordinates of the fixed points FP1-FP24 are read out from the EEPROM.

In step S102, fixed points are defined or selected in the original image. In step S103, an original small image RPA is set with respect to each of the fixed points, and a search area SA is set in the comparison image. In step S104, a plurality of comparison small images SPA are set based on the search area SA. Namely, all the pixels in the search areas SA are set as candidate points, and comparison small images SPA forming squares, the center of which is each of the candidate points CP, are set.

In step S105, luminance values of the original small images RPA and each of the comparison small images SPA are readout from the SDRAM 16, and the SAD of the luminance values is calculated for each of the comparison small images SPA, i.e., the candidate points CP. In step S106, a minimum value of the SADs calculated in step S105 is detected, and the candidate point CP in which the minimum SAD is detected is set as the shift point, which is a shift position of the fixed point selected in step S102.

In step S107, it is determined whether shift points have been detected for all of the fixed points. When there are any shift points which have not been detected, the process goes back to step S102. Thus, step S102 through step S107 are repeatedly performed until all the shift points have been detected. When all the shift points have been detected, the process continues on to step S108.

In step S108, the comparison image is divided into partial images PA1-PA15 as shown in FIG. 5. In step S109, the partial images PA1-PA15 are transformed to produce transformed partial images. In step S110, the transformed partial images are combined to produce a combined image, and the image data of the combined image is stored in the SDRAM 16.

In step S111, it is determined whether the position-matching operation has been completed for all the images stored in the SDRAM 16, i.e., whether combined images have been produced for all the images other than the original image. When the position-matching operations for all the images have not been finished, the process goes back to step S100, and step S100 through step S111 are repeatedly performed until the position-matching operations have been completed for all of the images. When the position-matching operation is completed for all of the images, the process continues on to step S112.

In step S112, the upper end, the lower end, the left end, and the right end, which are outer edges used for the trimming process, are detected. In step S113, using the outer edges obtained in step S112, the trimming process for the original image and the combined images stored in the SDRAM 16 is performed. The original image and the combined images, which have been subjected to the trimming process, are then stored in the SDRAM 16, and the position-matching operation ends.

According to the image processing system of the embodiment having the constructions described above, the position-matching operation can be performed with a high degree of accuracy, without calculating a motion vector for the whole image from a set amount of translations for a plurality of fixed points. Namely, it is not necessary to calculate the motion vector for the whole image based on an aggregation of translations.

In this embodiment, since the combined image is produced based on the comparison image, even when the camera is rotated in a panning direction or in a tilting direction during a photographing operation of two images, the position-matching operation can be performed.

Figure 11:
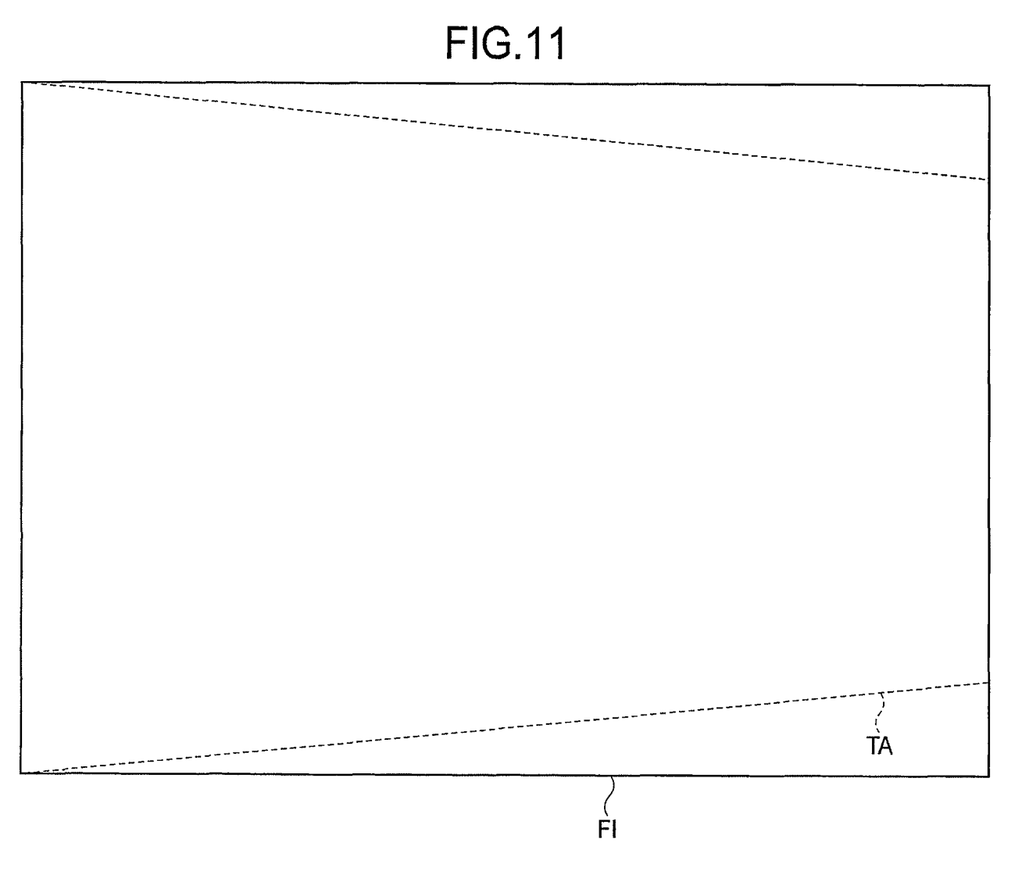
FIG. 11 is a view showing a change between the shapes of continuous two-frame images that are formed when the camera is rotated or panned in a horizontal direction.

As shown in FIG. 11, for example, when the digital camera 10 is rotated in a panning direction during a photographing operation of two frame images, a rectangular image FI formed when the first frame image signal is generated is transformed to a trapezoidal shape TA when the second frame image signal is generated. In such a way the second frame image having a different magnification rate or reduction rate, depending on the position of image, does not exactly overlap with the first frame image even if the second image is translated and rotated about the optical axis. Therefore, in a conventional method, a position-matching operation cannot be carried out with a high degree of accuracy when the camera is rotated in a panning direction or a tilting direction. Conversely, in this embodiment the second frame image is transformed to overlap with the first frame image, and the position-matching operation can be performed with a high degree of accuracy.

As described above, the embodiment is configured to identify a candidate point, which is contained in a comparison small image that is mostly similar to a basic small image among a plurality of comparison small images, based on the SAD regarding the original image and the combined images. However, the similarity between the original small image and the comparison small image may be determined using another method known in the art.

In this embodiment, a candidate point of the comparison small image, which has the highest similarity with respect to the original small image, is detected as a shift position of a fixed point. However, the shift position of the fixed point may be detected using a method for calculating a motion vector that is known in the art.

Although, in the embodiment, the comparison image is divided into square partial images, any partial image that is a polygon with vertices that coincide with three or more fixed points, can be used.

Although the position-matching operation is performed using the fixed points FP1-FP24 in this embodiment, the position-matching operation can be performed using four or more fixed points.

Although all of the pixels in the search area SA are set with respect to the candidate points CP in this embodiment, all of the pixels need not be selected. Namely, if points with preset positions relative to the fixed points, are set with respect to the candidate point, the same effect as the present embodiment can be obtained.

In the embodiment, the original small image RPA is set such that the fixed points are at the center of the original small images RPA, and the comparison small images SPA are set such that the candidate points CP are at the centers of the comparison small images SPA. However, the positions of the fixed points and the candidate points CP need not coincide with the centers of the corresponding images. Namely, if the relative positions between the fixed points in the original images RPA and the candidate points in the comparison small images SPA are the same, the same effect as the present embodiment can be obtained.

While the image processing system is provided for a digital camera in this embodiment, the image processing system can be provided for another photographing device such as a digital video camera, or an image composing device.

The image processing system, to which the embodiment is applied, can be a computer in which an image transforming program is installed.

Further, although an image that is generated first is designated as an original image in this embodiment, an image that is generated later can instead be designated as an original image and the image that is generated first can be designated as the comparison image.

The present disclosure relates to subject matter contained in Japanese Patent Applications Nos. 2010-198225 (filed on Sep. 3, 2010) and 2011-178405 (filed on Aug. 17, 2011) which are expressly incorporated herein, by reference, in their entireties.

The invention claimed is:

1. An image processing system performing a position-matching operation on first and second images, which are obtained by photographing a same object sequentially, each of the first and second images being obtained in a single photographing operation, so that said first and second images are composed, said image processing system comprising:
a shift point detecting processor that detects a plurality of shift points in said second image, said plurality of shift points corresponding to a plurality of fixed points that are dispersed throughout the whole of said first image;
an image dividing processor that divides said second image into a plurality of polygonal partial images, the vertices of which are positioned at the same coordinates as said fixed points in said first image;
an image transforming processor that shifts the vertices of each of said partial images to said shift points, to transform said partial images so that corresponding transformed partial images, having irregular shapes, are produced; and
an image combining processor that forms a combined image by combining all of said transformed partial images in such a manner that the common shift points remain in the same positions.

2. The image processing system according to claim 1, wherein said shift point detecting processor comprises:
an original small image definition processor that defines an original small image in said first image, the center of said original small image coinciding with said fixed point;
a comparison small image definition processor that defines a plurality of comparison small images in said second image, each of said comparison small images having a same size as a size of said original small image, the centers of said comparison small images coinciding with candidate points, which are set in connection with said fixed points; and
a candidate point selection processor that selects one of said candidate points, which is contained in a comparison small image that is most similar to said original small image among said plurality of comparison small images.

3. The image processing system according to claim 2, wherein said candidate point selection processor obtains an absolute value of a difference between luminance values of the corresponding pixels in said original small image and in each of said comparison small images, and determines that the comparison small image is most similar to said original small image when a sum of the absolute values of the differences for all the pixels in the comparison small image is a minimum.

4. The image processing system according to claim 1, further comprising an image composing processor that removes an area other than an overlapped area, in which said first image and said combined image overlap, and composes said first image and said combined image.

5. An image processing method performing a position-matching operation on first and second images, so that the first and second images are composed, the image processing method comprising:
receiving, by a processor, the first and second images, which are obtained by photographing a same object sequentially, each of the first and second images being obtained in a single photographing operation;
detecting, by a processor, a plurality of shift points in the second image, the plurality of shift points corresponding to a plurality of fixed points that are dispersed throughout the whole of the first image;
dividing, by a processor, the second image into a plurality of polygonal partial images, the vertices of which are positioned at the same coordinates as the fixed points in the first image;
shifting, by a processor, the vertices of each of the partial images to the shift points, to transform the partial images so that corresponding transformed partial images, having irregular shapes, are produced; and
forming, by a processor, a combined image by combining all of the transformed partial images in such a manner that the common shift points remain in the same positions.

6. The image processing method according to claim 5, wherein the detecting comprises:
defining an original small image in the first image, the center of the original small image coinciding with the fixed point;
defining a plurality of comparison small images in the second image, each of the comparison small images having a same size as a size of the original small image, the centers of the comparison small images coinciding with the centers of candidate points, which are set in connection with the fixed points; and selecting one of the candidate points, which is contained in the comparison small image that is most similar to the original small image among the plurality of comparison small mages.

7. The image processing method according to claim 6, wherein the selecting one of the candidate points obtains an absolute value of a difference between luminance values of corresponding pixels in the original small image and in each of the comparison small images, and determines that a comparison small image is most similar to said original small image when the sum of the absolute values of the differences for all the pixels is a minimum.

8. The image processing method according to claim 5, further comprising removing an area other than an overlapped area, in which the first image and the combined image overlap, and composing the first image and the combined image.

9. The image processing system according to claim 1, wherein the polygonal partial images obtained by the image dividing processor have a rectangular shape, and the transformed partial images obtained by the transformation of the image transforming processor have irregular quadrangle shapes.

10. The image processing system according to claim 1, wherein the first image and second image are obtained at different shutter speeds.

11. The image processing method according to claim 5, wherein the polygonal partial images obtained by the dividing have a rectangular shape, and the transformed partial images obtained by the transforming have irregular quadrangle shapes.

12. The image processing method according to claim 5, wherein the first image and second image are obtained at different shutter speeds.

\* \* \* \* \*